United States Patent
Yokoi

(10) Patent No.: US 12,069,787 B2
(45) Date of Patent: Aug. 20, 2024

(54) LIGHTING DEVICE, LIGHTING CONTROL METHOD, AND LIGHTING CONTROL PROGRAM

(71) Applicant: KYOCERA Corporation, Kyoto (JP)

(72) Inventor: Kiyotaka Yokoi, Hikone (JP)

(73) Assignee: KYOCERA CORPORATION, Kyoto (JP)

( * ) Notice: Subject to any disclaimer, the term of this patent is extended or adjusted under 35 U.S.C. 154(b) by 298 days.

(21) Appl. No.: 17/623,138

(22) PCT Filed: Jun. 26, 2020

(86) PCT No.: PCT/JP2020/025359
§ 371 (c)(1),
(2) Date: Dec. 27, 2021

(87) PCT Pub. No.: WO2020/262657
PCT Pub. Date: Dec. 30, 2020

(65) Prior Publication Data
US 2022/0264728 A1    Aug. 18, 2022

(30) Foreign Application Priority Data

Jun. 28, 2019 (JP) ................................. 2019-121834

(51) Int. Cl.
| | |
|---|---|
| *H05B 47/16* | (2020.01) |
| *A01G 7/04* | (2006.01) |
| *A01K 63/06* | (2006.01) |
| *F21S 4/28* | (2016.01) |
| *F21V 9/30* | (2018.01) |

(52) U.S. Cl.
CPC ............. *H05B 47/16* (2020.01); *A01G 7/045* (2013.01); *A01K 63/06* (2013.01); *F21S 4/28* (2016.01); *F21V 9/30* (2018.02)

(58) Field of Classification Search
None
See application file for complete search history.

(56) References Cited

U.S. PATENT DOCUMENTS

| | | | | |
|---|---|---|---|---|
| 8,853,972 | B2* | 10/2014 | Slot ......................... | H05B 45/12 |
| | | | | 315/210 |
| 9,635,732 | B2* | 4/2017 | Herremans ............ | H05B 47/16 |
| 9,730,433 | B2* | 8/2017 | Sahin ...................... | H02S 40/38 |
| 9,936,546 | B2* | 4/2018 | Slot ......................... | H05B 47/18 |
| 11,758,858 | B2* | 9/2023 | Lim ........................ | A01G 31/06 |
| | | | | 47/17 |

(Continued)

FOREIGN PATENT DOCUMENTS

| | | |
|---|---|---|
| JP | 2010-187625 A | 9/2010 |
| JP | 2019-62185 A | 4/2019 |
| WO | 2013/094053 A1 | 6/2013 |

*Primary Examiner* — Srinivas Sathiraju
(74) *Attorney, Agent, or Firm* — Volpe Koenig

(57) ABSTRACT

A lighting device includes: a light emitting unit that emits illumination light; and a control unit that controls an intensity of the illumination light. The control unit controls the intensity of the illumination light in each of a period of no change during which the control unit keeps the intensity of the illumination light constant and a period of change during which the control unit changes the intensity of the illumination light as time passes. The period of no change is longer than the period of change.

18 Claims, 7 Drawing Sheets

(56) References Cited

U.S. PATENT DOCUMENTS

| | | | |
|---|---|---|---|
| 11,771,016 B2* | 10/2023 | Khwaja | A01G 9/249 47/17 |
| 11,778,706 B1* | 10/2023 | Mischel, Jr. | H05B 47/16 315/297 |
| 2008/0191642 A1* | 8/2008 | Slot | H05B 45/20 315/295 |
| 2011/0133655 A1* | 6/2011 | Recker | H05B 47/13 315/159 |
| 2012/0080944 A1* | 4/2012 | Recker | H05B 47/16 307/25 |
| 2013/0141018 A1* | 6/2013 | Kamii | H05B 47/16 315/360 |
| 2014/0252987 A1* | 9/2014 | Hinrichs | H05B 45/20 315/297 |
| 2014/0292106 A1* | 10/2014 | Miyahara | A01K 63/06 307/116 |
| 2015/0028775 A1* | 1/2015 | Zudrell-Koch | H05B 47/185 315/307 |
| 2015/0054413 A1* | 2/2015 | Chen | H05B 45/31 315/155 |
| 2015/0069930 A1* | 3/2015 | Slot | H05B 45/20 315/293 |
| 2015/0230409 A1* | 8/2015 | Nicole | A01G 9/14 315/153 |
| 2015/0359061 A1* | 12/2015 | Adler | H05B 47/16 315/153 |
| 2016/0120000 A1* | 4/2016 | Chen | H05B 45/37 315/200 R |
| 2016/0183477 A1* | 6/2016 | Kao | G05D 23/1917 315/307 |
| 2016/0270183 A1* | 9/2016 | Wölfing | H05B 47/16 |
| 2016/0330825 A1* | 11/2016 | Recker | H05B 47/115 |
| 2016/0374177 A1* | 12/2016 | Chen | G06F 3/04883 |
| 2017/0127487 A1* | 5/2017 | Slot | H05B 45/48 |
| 2019/0191643 A1* | 6/2019 | Chan | H05B 45/10 |
| 2020/0253129 A1* | 8/2020 | Nicole | H05B 47/105 |
| 2020/0279980 A1* | 9/2020 | Katou | H01L 33/50 |
| 2021/0282247 A1* | 9/2021 | Ogawa | H04N 9/3164 |
| 2022/0264728 A1* | 8/2022 | Yokoi | F21S 4/28 |

* cited by examiner

LIGHTING DEVICE, LIGHTING CONTROL METHOD, AND LIGHTING CONTROL PROGRAM

CROSS-REFERENCE TO RELATED APPLICATION

The present application claims priority to Japanese Patent Application No. 2019-121834 (filed on Jun. 28, 2019), the disclosure of which is incorporated herein by reference in its entirety.

TECHNICAL FIELD

The present disclosure relates to a lighting device, a lighting control method, and a lighting control program.

BACKGROUND ART

A lighting device that controls the amount of light on the basis of an amount-of-light pattern for illuminance set for each time period is known (see, for example, PTL 1).

CITATION LIST

Patent Literature

PTL 1: Japanese Unexamined Patent Application Publication No. 2010-187625

SUMMARY OF INVENTION

A lighting device according to one embodiment of the present disclosure includes: a light emitting unit that emits illumination light; and a control unit that controls an intensity of the illumination light. The control unit controls the intensity of the illumination light in each of a period of no change during which the control unit keeps the intensity of the illumination light constant and a period of change during which the control unit changes the intensity of the illumination light as time passes. The period of no change is longer than the period of change.

A lighting control method according to one embodiment of the present disclosure includes a step, by a control unit that controls an intensity of illumination light emitted by a light emitting unit, of obtaining time data. The lighting control method includes a step, by the control unit, of performing on the basis of the time data, one of control for keeping the intensity of the illumination light constant or control for changing the intensity of the illumination light as time passes. A period during which the intensity of the illumination light is kept constant is longer than a period during which the intensity of the illumination light is changed.

A lighting control program according to one embodiment of the present disclosure is executed by a processor that functions as a control unit that controls an intensity of illumination light emitted by a light emitting unit. The lighting control program includes a step of obtaining time data. The lighting control program includes a step of performing on the basis of the time data, one of control for keeping the intensity of the illumination light constant or control for changing the intensity of the illumination light as time passes. A period during which the intensity of the illumination light is kept constant is longer than a period during which the intensity of the illumination light is changed.

DESCRIPTION OF EMBODIMENTS

It is desirable to provide a comfortable lighting environment for living things.

Figure 1:
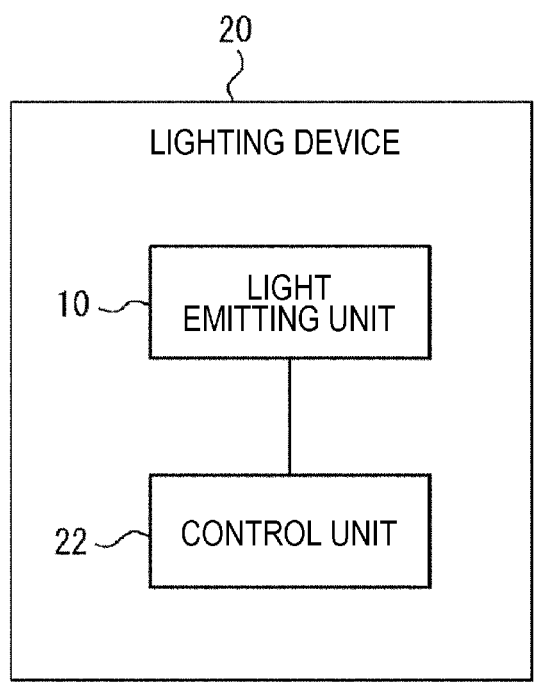
FIG. 1 is a block diagram illustrating an example configuration of a lighting device according to one embodiment.

As illustrated in FIG. 1, a lighting device 20 according to one embodiment includes a light emitting unit 10 and a control unit 22.

The light emitting unit 10 emits light for illuminating a predetermined target. The light for illuminating a predetermined target is also called illumination light. As described below, the light emitting unit 10 emits light identified with a predetermined spectrum as illumination light. The predetermined spectrum may have, for example, a peak wavelength in a wavelength range of 360 nm to 430 nm and may have a peak wavelength in a wavelength range of 360 nm to 780 nm.

The control unit 22 controls the intensity and spectrum of illumination light emitted by the light emitting unit 10. The light emitting unit 10 can emit light rays identified with various spectra on the basis of control instructions from the control unit 22. The control unit 22 may be configured as a control device separately from the lighting device 20.

The control unit 22 may include at least one processor in order to provide control and a processing capacity for executing various functions. The processor can execute a program for implementing various functions of the control unit 22. The processor may be implemented as a single integrated circuit. The integrated circuit is also called an IC. The processor may be implemented as a plurality of integrated circuits and discrete circuits that are communicably connected to each other. The processor may be implemented on the basis of other various known techniques.

The lighting device 20 may further include a storage unit. The storage unit may include an electromagnetic storage medium, such as a magnetic disk, or may include a memory, such as a semiconductor memory or a magnetic memory. The storage unit stores, for example, various types of information and the program executed by the control unit 22. The storage unit may function as a work memory of the control unit 22. At least part of the storage unit may be included in the control unit 22.

Figure 2:
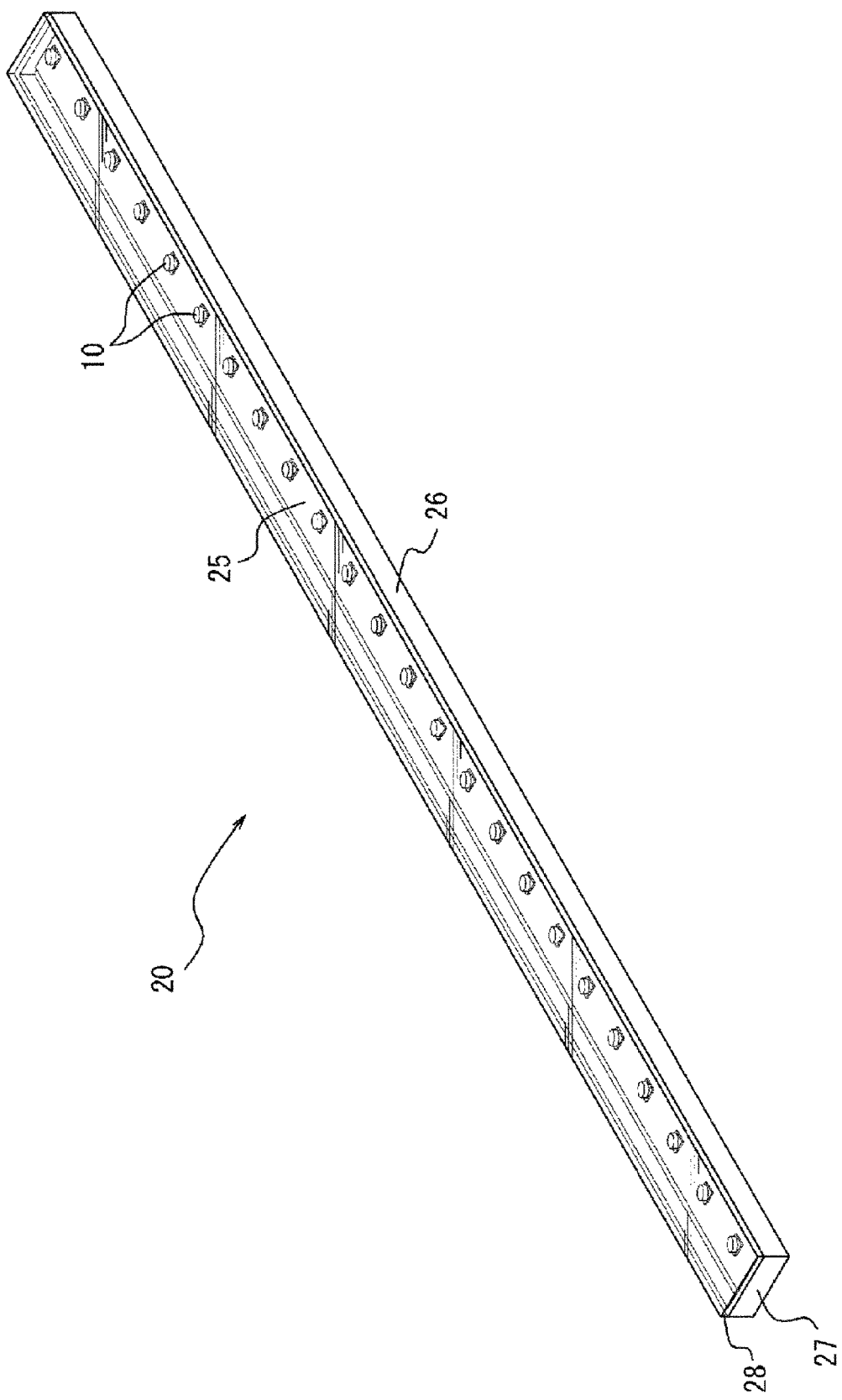
FIG. 2 is a perspective view illustrating an example configuration of the lighting device including light emitting units.

As illustrated in FIG. 2, the lighting device 20 may further include a mounting board 25 on which the light emitting units 10 are mounted. The lighting device 20 may further include a housing 26 having a groove part for accommodating the mounting board 25, and a pair of end boards 27 for closing the respective end parts on the short sides of the housing 26. The number of light emitting units 10 mounted on the mounting board 25 may be one or two or more. The light emitting units 10 may be mounted so as to be aligned on the mounting board 25 or may be mounted so as to be arranged in a grid or a diagonal grid. The light emitting units 10 need not be mounted on the mounting board 25 in accordance with the above-described patterns and may be mounted on the mounting board 25 in accordance with various arrangement patterns.

The mounting board 25 may include a circuit board having a wiring pattern. The circuit board may include, for example, a printed circuit board, such as a rigid board, a flexible board, or a rigid flexible board. The circuit board may electrically connect the light emitting units 10 and the control unit 22 to each other.

The mounting board 25 has a function of externally dissipating heat generated by the light emitting units 10. The mounting board 25 may be formed of, for example, a metal material, such as aluminum, copper, or stainless steel, an organic resin material, or a composite material containing the above-described materials.

The mounting board 25 may have an elongated rectangular shape in plan view. The mounting board 25 may be formed such that the length in the longitudinal direction is 100 mm or more and 2000 mm or less. The mounting board 25 need not have the above-described shape and may have other various shapes.

The lighting device 20 may further include a cover 28 for enclosing the mounting board 25 and the light emitting units 10 accommodated in the housing 26. The cover 28 is formed of a translucent material to transmit illumination light emitted by the light emitting units 10 outside the lighting device 20. The cover 28 may be formed of, for example, a resin material, such as an acrylic resin, or glass. The cover 28 may have an elongated rectangular shape in plan view. The cover 28 may be formed such that the length in the longitudinal direction is 98 mm or more and 1998 mm or less. The cover 28 need not have the above-described shape and may have other various shapes. The lighting device 20 may further include a sealing member between the cover 28 and the housing 26. Accordingly, for example, water or dust is less likely to enter the inside of the housing 26. As a result, the reliability of the lighting device 20 can be increased regardless of the environment in which the lighting device 20 is placed. The lighting device 20 may further include a moisture absorbent inside the housing 26.

<Light Emitting Device>

Figure 3:
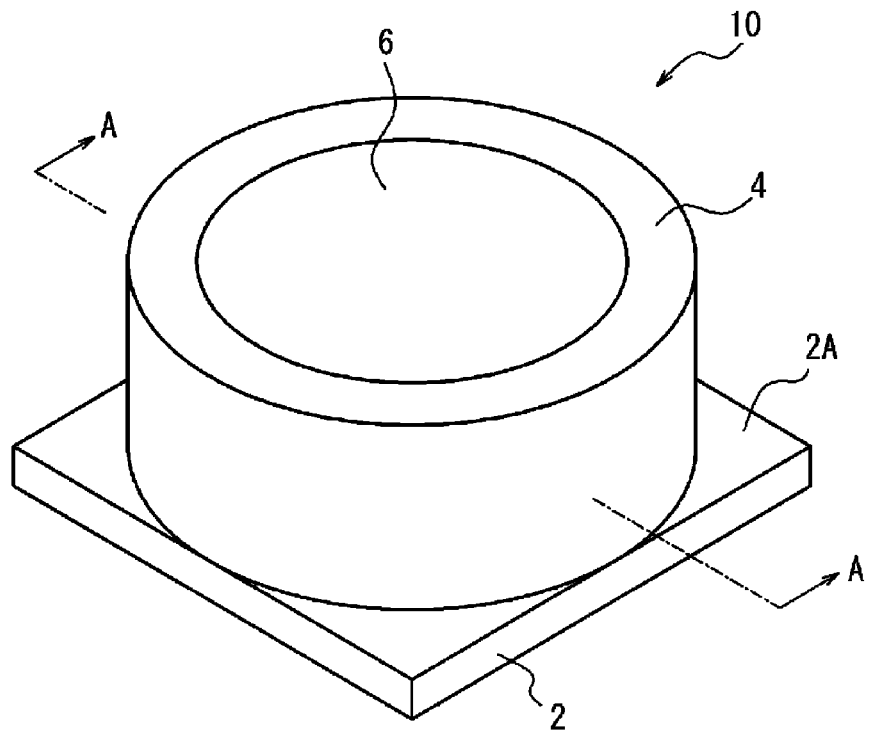
FIG. 3 is an external perspective view illustrating an example configuration of the light emitting device.
Figure 4:
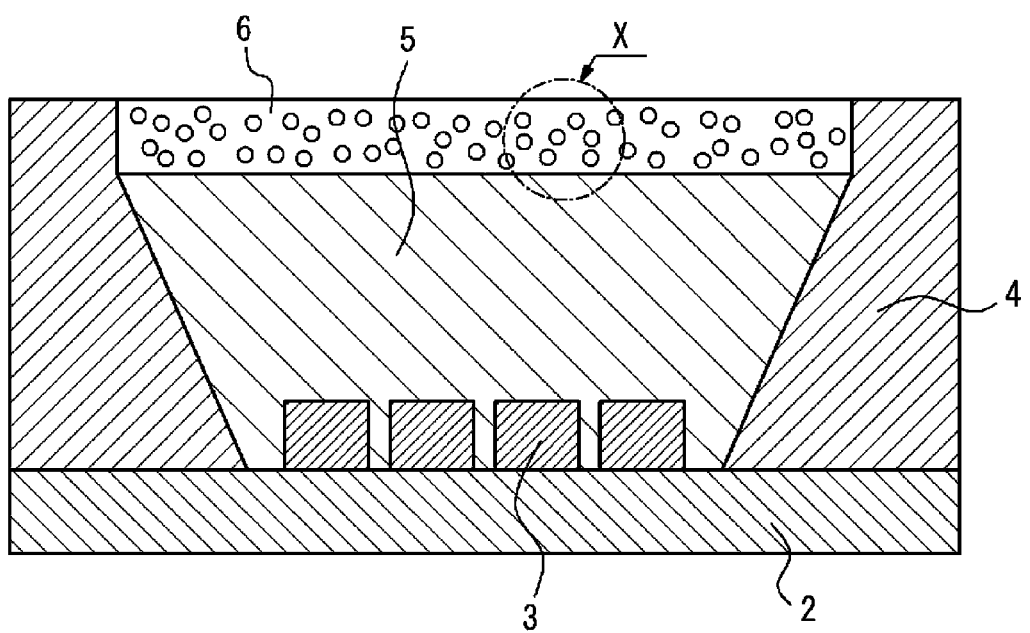
FIG. 4 is a cross-sectional view cut along A-A in FIG. 3.
Figure 5:
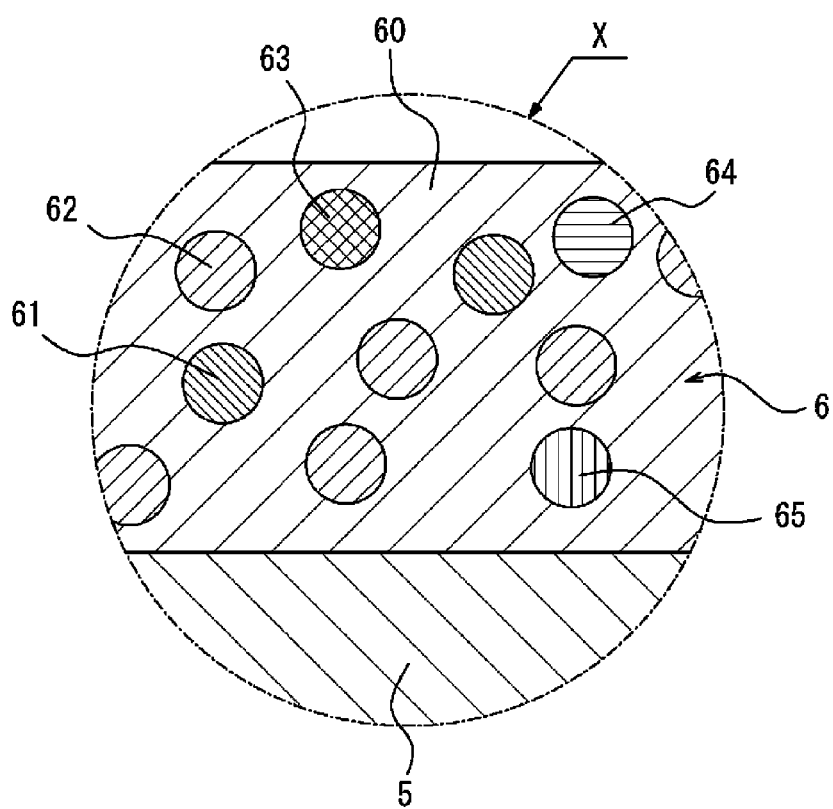
FIG. 5 is an enlarged view of a circled part in FIG. 4.

As illustrated in FIG. 3, FIG. 4, and FIG. 5, the light emitting unit 10 includes a light emitting element 3 and a wavelength conversion member 6. The light emitting unit 10 may further include an element substrate 2, a frame body 4, and a sealing member 5.

The light emitting element 3 emits light having a peak wavelength in a wavelength range of 360 nm to 430 nm. Light having a peak wavelength in a wavelength range of 360 nm to 430 nm is also called violet light. A wavelength range of 360 nm to 430 nm is also called a violet light range.

The wavelength conversion member 6 converts light coming into the wavelength conversion member 6 from the light emitting element 3 to light having a peak wavelength in the visible light range and emits the converted light. It is assumed that visible light includes violet light. It is assumed that the visible light range includes the violet light range.

The light emitting unit 10 may include a plurality of wavelength conversion members 6. The plurality of wavelength conversion members 6 may emit light rays having different peak wavelengths respectively. The light emitting unit 10 can emit light rays having various spectra by controlling the intensity of a light ray emitted by each wavelength conversion member 6.

The element substrate 2 may be formed of, for example, an insulating material. The element substrate 2 may be formed of, for example, a ceramic material, such as alumina or mullite, a glass ceramic material, or a composite material obtained by mixing a plurality of materials among the above-described materials. The element substrate 2 may be formed of, for example, a polymeric resin material in which metal-oxide particles for which thermal expansion can be adjusted are dispersed.

The element substrate 2 may include, on a main surface 2A of the element substrate 2 or inside the element substrate 2, a wiring conductor that allows electrical conduction of components including the light emitting element 3 mounted on the element substrate 2. The wiring conductor may be formed of, for example, a conductive material, such as tungsten, molybdenum, manganese, or copper. The wiring conductor may be formed by printing, on ceramic green sheets that form the element substrate 2, a predetermined pattern with metal paste made of tungsten powder to which an organic solvent is added and by stacking and firing the plurality of ceramic green sheets. On the surface of the wiring conductor, for example, a plated layer made of, for example, nickel or gold may be formed to prevent oxidation.

The element substrate 2 may include a metal reflection layer spaced apart from the wiring conductor and the plated layer to efficiently transmit light emitted by the light emitting element 3 to the outside. The metal reflection layer may be formed of, for example, a metal material made of, for example, aluminum, silver, gold, copper, or platinum.

This embodiment assumes that the light emitting element 3 is an LED. An LED has a PN junction at which a P-type semiconductor and an N-type semiconductor join and at which electrons and positive holes are recoupled to thereby externally emit light. The light emitting element 3 is not limited to an LED and may be another type of light emitting element.

The light emitting element 3 is mounted on the main surface 2A of the element substrate 2. The light emitting element 3 may be electrically connected onto the plated layer that adheres to the surface of the wiring conductor provided on or in the element substrate 2 with, for example, a brazing material or solder therebetween. The number of light emitting elements 3 mounted on the main surface 2A of the element substrate 2 is not specifically limited.

The light emitting element 3 may include a translucent base substrate and an optical semiconductor layer formed on the translucent base substrate. The translucent base substrate includes, for example, a material that allows deposition of the optical semiconductor layer thereon using chemical vapor deposition, such as metal-organic chemical vapor deposition or molecular beam epitaxial deposition. The translucent base substrate may be made of, for example, sapphire, gallium nitride, aluminum nitride, zinc oxide, zinc selenide, silicon carbide, silicon (Si), or zirconium diboride. The thickness of the translucent base substrate may be, for example, 50 μm or more and 1000 μm or less.

The optical semiconductor layer may include a first semiconductor layer formed on the translucent base substrate, a light emitting layer formed on the first semiconductor layer, and a second semiconductor layer formed on the light emitting layer. The first semiconductor layer, the light emitting layer, and the second semiconductor layer may be formed of, for example, a III-nitride semiconductor, a III-V semiconductor such as gallium phosphide or gallium arsenide, or a III-nitride semiconductor such as gallium nitride, aluminum nitride, or indium nitride.

The thickness of the first semiconductor layer may be, for example, 1 μm or more and 5 μm or less. The thickness of the light emitting layer may be, for example, 25 nm or more and 150 nm or less. The thickness of the second semiconductor layer may be, for example, 50 nm or more and 600 nm or less.

The frame body 4 may be formed of, for example, a ceramic material, such as aluminum oxide, titanium oxide, zirconium oxide, or yttrium oxide. The frame body 4 may be formed of a porous material. The frame body 4 may be formed of a resin material into which powder that contains a metal oxide, such as aluminum oxide, titanium oxide, zirconium oxide, or yttrium oxide, is mixed. The frame body 4 need not be formed of the above-described materials and may be formed of various materials.

The frame body 4 is connected to the main surface 2A of the element substrate 2 with, for example, a resin, a brazing material, or solder therebetween. The frame body 4 is provided on the main surface 2A of the element substrate 2 so as to be spaced apart from the light emitting element 3 and surround the light emitting element 3. The frame body 4 is provided such that its inner wall surface is gradually inclined so as to extend outward as its part is farther from the main surface 2A of the element substrate 2. The inner wall surface functions as a reflection surface that reflects light emitted by the light emitting element 3. The inner wall surface may include, for example, a metal layer formed of a metal material, such as tungsten, molybdenum, or manganese, and a plated layer that covers the metal layer and is formed of a metal material, such as nickel or gold. The plated layer reflects light emitted by the light emitting element 3.

The shape of the inner wall surface of the frame body 4 may be a round shape in plan view. When the shape of the inner wall surface is a round shape, the frame body 4 can substantially uniformly reflect light emitted by the light emitting element 3 outward. The angle of inclination of the inner wall surface of the frame body 4 may be set to, for example, an angle of 55 degrees or more and 70 degrees or less relative to the main surface 2A of the element substrate 2.

The inner space surrounded by the element substrate 2 and the frame body 4 is filled with the sealing member 5 except a part of the upper part of the inner space surrounded by the frame body 4. The sealing member 5 encloses the light emitting element 3 and transmits light emitted by the light emitting element 3. The sealing member 5 may be formed of, for example, a material having optical transparency. The sealing member 5 may be formed of, for example, an insulating resin material having optical transparency, such as a silicone resin, an acrylic resin, or an epoxy resin, or a glass material having optical transparency. The refractive index of the sealing member 5 may be set to, for example, 1.4 or more and 1.6 or less.

In a case where the light emitting unit 10 includes the sealing member 5, violet light emitted from the light emitting element 3 passes through the sealing member 5 and enters the wavelength conversion member 6. As described above, the wavelength conversion member 6 converts the violet light coming thereinto from the light emitting element 3 to light rays having various peak wavelengths included in the visible light range. The light emitting element 3 is located such that the emitted violet light enters the wavelength conversion member 6. In other words, the wavelength conversion member 6 is located such that light emitted from the light emitting element 3 enters the wavelength conversion member 6. In the structure illustrated in FIG. 3 to FIG. 5, the wavelength conversion member 6 is located in the part of the upper part of the inner space surrounded by the element substrate 2 and the frame body 4 along the upper surface of the sealing member 5. The wavelength conversion member 6 need not be located as in the example described above and may be located so as to, for example, extend out of the upper part of the inner space surrounded by the element substrate 2 and the frame body 4.

As illustrated in FIG. 5, the wavelength conversion member 6 may include a translucent member 60 having optical transparency, a first fluorescent substance 61, a second fluorescent substance 62, a third fluorescent substance 63, a fourth fluorescent substance 64, and a fifth fluorescent substance 65.

The first fluorescent substance 61, the second fluorescent substance 62, the third fluorescent substance 63, the fourth fluorescent substance 64, and the fifth fluorescent substance 65 are also simply called fluorescent substances. It is assumed that the fluorescent substances are contained in the translucent member 60. The fluorescent substances may be substantially uniformly dispersed in the translucent member 60. The fluorescent substances convert violet light entering the wavelength conversion member 6 to light rays having peak wavelengths included in a wavelength range of 360 nm to 780 nm and emits the converted light rays.

The translucent member 60 may be formed of, for example, an insulating resin having optical transparency, such as a fluorine resin, a silicone resin, an acrylic resin, or an epoxy resin, or a glass material having optical transparency.

The fluorescent substances convert incoming violet light to light rays having various peak wavelengths.

The first fluorescent substance 61 may convert violet light to light identified with a spectrum having a peak wavelength in a wavelength range of, for example, 400 nm to 500 nm, that is, blue light. As the first fluorescent substance 61, for example, $BaMgAl_{10}O_{17}$:Eu, or $(Sr,Ca,Ba)_{10}(PO_4)_6Cl_2$:Eu, $(Sr, Ba)_{10}(PO_4)_6Cl_2$:Eu can be used.

The second fluorescent substance 62 may convert violet light to light identified with a spectrum having a peak wavelength in a wavelength range of, for example, 450 nm to 550 nm, that is, blue-green light. As the second fluorescent substance 62, for example, $(Sr,Ba,Ca)_5(PO_4)_3Cl$:Eu, $Sr_4Al_{14}O_{25}$:Eu can be used.

The third fluorescent substance 63 may convert violet light to light identified with a spectrum having a peak wavelength in a wavelength range of, for example, 500 nm to 600 nm, that is, green light. As the third fluorescent substance 63, for example, $SrSi_2(O,Cl)_2N_2$:Eu, $(Sr,Ba,Mg)_2SiO_4$:$Eu^{2+}$, or ZnS:Cu,Al, $Zn_2SiO_4$:Mn can be used.

The fourth fluorescent substance 64 may convert violet light to light identified with a spectrum having a peak wavelength in a wavelength range of, for example, 600 nm to 700 nm, that is, red light. As the fourth fluorescent substance 64, for example, $Y_2O_2S$:Eu, $Y_2O_3$:Eu, $SrCaClAlSiN_3$:$Eu^{2+}$, $CaAlSiN_3$:Eu, or $CaAlSi(ON)_3$:Eu can be used.

The fifth fluorescent substance 65 may convert violet light to light identified with a spectrum having a peak wavelength in a wavelength range of, for example, 680 nm to 800 nm, that is, near-infrared light. The near-infrared light may include light in a wavelength range of 680 to 2500 nm. As the fifth fluorescent substance 65, for example, $3Ga_5O_{12}$:Cr can be used.

The combination of the types of fluorescent substances contained in the wavelength conversion member 6 is not specifically limited. As indicated by the region X in FIG. 4 and FIG. 5, the wavelength conversion member 6 may have the first fluorescent substance 61, the second fluorescent substance 62, the third fluorescent substance 63, the fourth fluorescent substance 64, and the fifth fluorescent substance 65. The wavelength conversion member 6 may have other types of fluorescent substances.

The light emitting unit 10 may include the plurality of wavelength conversion members 6. The wavelength conversion members 6 may have different combinations of fluorescent substances. The light emitting unit 10 may include the light emitting element 3 that emits violet light to each wavelength conversion member 6. The light emitting unit 10 can emit light rays having various spectra by controlling the intensity of violet light that enters each wavelength conversion member 6.

The light emitting unit 10 according to this embodiment can emit light rays having various spectra by a combination of the wavelength conversion members 6. For example, the light emitting unit 10 can emit light having, for example, the spectrum of direct sunlight from the sun, the spectrum of sunlight that reaches a predetermined depth under the sea, the spectrum of candle light, or the spectrum of a firefly flash. In other words, the light emitting unit 10 can emit light rays in various colors.

The lighting device 20 may include a plurality of light emitting units 10. The plurality of light emitting units 10 may include a first light emitting device and a second light emitting device. The control unit 22 may control the intensity of light emitted by the first light emitting device and the intensity of light emitted by the second light emitting device independently of each other or in association with each other. The spectrum of light emitted by the first light emitting device may be different from the spectrum of light emitted by the second light emitting device. The control unit 22 may control the intensity of light emitted by the first light emitting device and the intensity of light emitted by the second light emitting device in association with each other to control the spectrum of light obtained by combining light emitted by the first light emitting device and light emitted by the second light emitting device. The light obtained by combining light emitted by the first light emitting device and light emitted by the second light emitting device is also called combined light. The lighting device 20 may emit combined light as illumination light.

<Control of Spectrum of Illumination Light>

Figure 6:
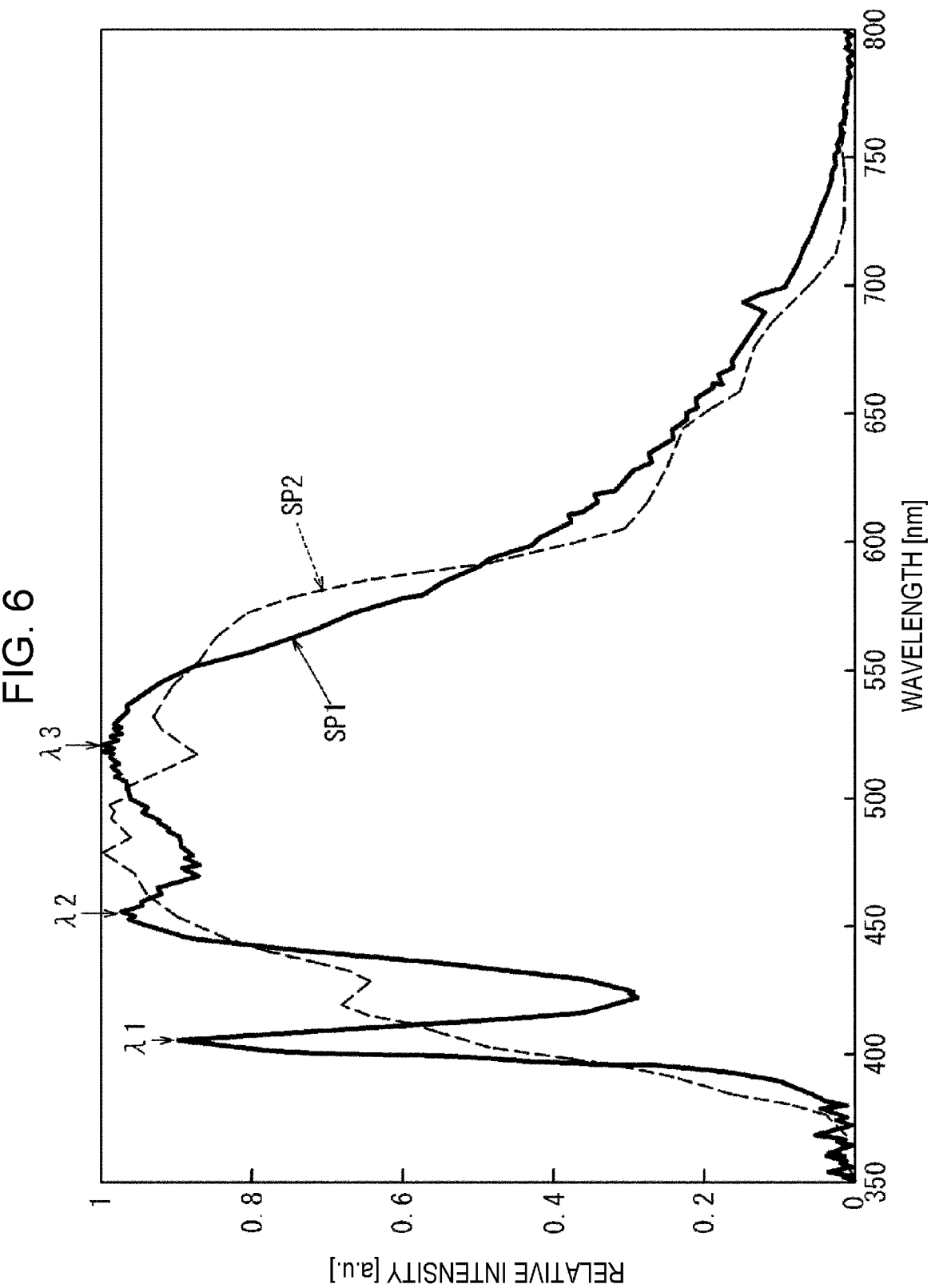
FIG. 6 is a graph showing an example spectrum of illumination light.

The control unit 22 may control the light emitting unit 10 such that the lighting device 20 emits illumination light identified with the emission spectrum SP1 illustrated in FIG. 6. The spectrum of light is measured, for example, by using a spectrophotometer or the like on the basis of spectroscopy. In the graph illustrated in FIG. 6, the horizontal axis represents the wavelength of illumination light emitted by the lighting device 20 and the vertical axis represents the relative light intensity at each wavelength.

The emission spectrum SP1 has a first peak wavelength λ1 in a wavelength range of 360 nm to 430 nm, a second peak wavelength λ2 in a wavelength range of 430 nm to 475 nm, and a third peak wavelength λ3 in a wavelength range of 480 nm to 550 nm. In the emission spectrum SP1, except for slight changes in the relative light intensity, as the wavelength increases from the third peak wavelength λ3 to a wavelength of 750 nm, the relative light intensity decreases. Note that the peak wavelengths described here and a peak wavelength described below may each refer to a wavelength at which the spectrum has a local maximum, that is, a wavelength at a point corresponding to a peak of the spectrum within a range from a valley to the peak and from the peak to another valley. In a case where, for example, various colors are emitted by using fluorescent substances, the spectrum may have very small peaks and valleys. Accordingly, for example, a local maximum in a wavelength range, from a certain valley to an adjacent valley, having a width of 20 nm or less is not regarded as a peak wavelength described above or a peak wavelength described below. That is, changes in peaks and valleys of a spectrum including wavelengths that are not regarded as wavelengths not included in peak wavelengths can be regarded as slight changes described above.

The emission spectrum SP2 illustrated in FIG. 6 represents the spectrum of sunlight that reaches a depth of about 2 m to 8 m under the sea. The sea at a depth of about 2 m to 8 m is also called a shallow sea. The emission spectrum SP1 is made closer to the emission spectrum SP2. When the spectrum of illumination light emitted by the lighting device 20 is made closer to the spectrum of sunlight that reaches a shallow sea, an environment illuminated with the illumination light can be an environment suitable for the growth of aquatic life living in a shallow sea. Examples of aquatic life living in a shallow sea include coral and zooxanthellae and so on living together with coral. An environment suitable for the growth of living things may be an environment in which the ratio of extinction of the living things in the environment is equivalent to the ratio of extinction in a natural environment or lower than the ratio of extinction in a natural environment. An environment suitable for the growth of living things may be an environment in which the degree of growth of living things in the environment is equivalent to the degree of growth in a natural environment or higher than the degree of growth in a natural environment.

Living things are often active in accordance with the cycle of movement of the sun. Therefore, an environment in which the intensity of light changes in accordance with movement of the sun can be an environment suitable for the growth of living things. The intensity of sunlight changes with the time of day. The intensity of sunlight increases over the period from sunrise to noon and decreases over the period from noon to sunset.

Figure 7:
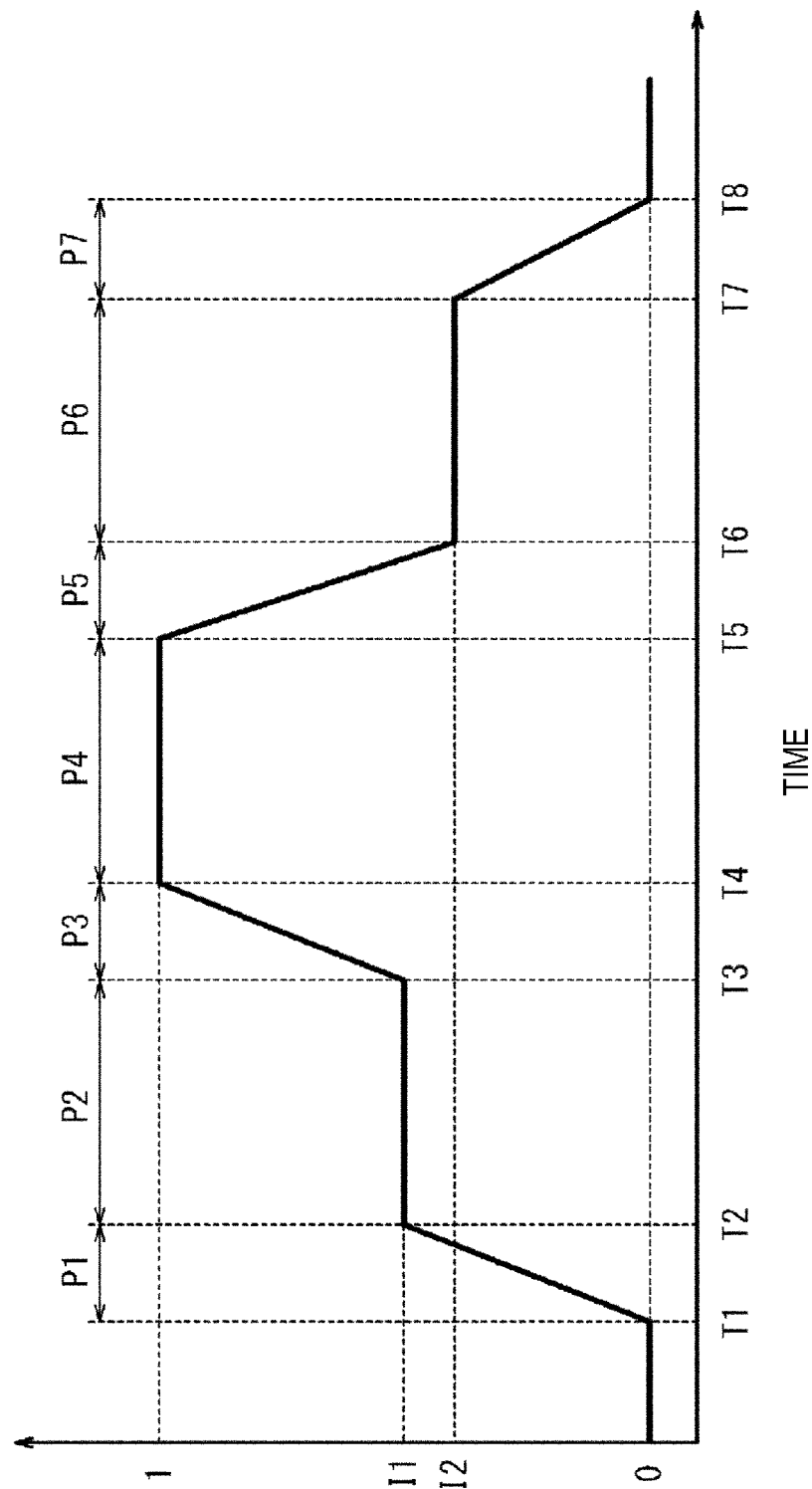
FIG. 7 is a graph showing the relative intensity of illumination light that changes as time passes.

The lighting device 20 may change the intensity of illumination light in accordance with movement of the sun. The control unit 22 may, for example, change the intensity of illumination light in accordance with the graph in solid lines illustrated in FIG. 7. In FIG. 7, the horizontal axis represents time and the vertical axis represents the relative intensity of illumination light. The relative intensity is calculated as the ratio of the intensity to the maximum value of intensity, where the maximum value is assumed to be equal to 1.

The control unit 22 keeps the intensity of illumination light at 0 until time T1 and increases the relative intensity of illumination light to I1 over the period from time T1 to time T2. The period from time T1 to time T2 is indicated as P1. The control unit 22 keeps the relative intensity of illumination light at I1 during the period from time T2 to time T3. The period from time T2 to time T3 is indicated as P3. The control unit 22 increases the relative intensity of illumination light to 1 over the period from time T3 to time T4. The period from time T3 to time T4 is indicated as P3. The control unit 22 keeps the relative intensity of illumination light at 1 during the period from time T4 to time T5. The period from time T4 to time T5 is indicated as P4. The control unit 22 decreases the relative intensity of illumination light to I2 over the period from time T5 to time T6. The period from time T5 to time T6 is indicated as P5. The control unit 22 keeps the relative intensity of illumination light at I2 during the period from time T6 to time T7. The period from time T6 to time T7 is indicated as P6. The control unit 22 decreases the relative intensity of illumination light to 0 over the period from time T7 to time T8 and keeps the intensity of illumination light at 0 after time T8. The period from time T7 to time T8 is indicated as P7. The control unit 22 keeps or changes the intensity of illumination light in each of the periods that correspond to passage of time.

The control unit 22 may set T1 to the time of sunrise and set T8 to the time of sunset. The control unit 22 may set T1 and T8 such that the period from time T1 to time T8 corresponds to the period from sunrise to sunset. The period from sunrise to sunset is also called daylight hours. The control unit 22 may set T4 and T5 such that the time when the sun culminates is included in the period from T4 to T5.

P1 and P3 each of which is a period during which the relative intensity of illumination light increases as time passes is also called a period of increase. P5 and P7 each of which is a period during which the relative intensity of illumination light decreases as time passes is also called a period of decrease. The period of increase and the period of decrease are each also called a period of change. The period of change corresponds to at least one of the period of increase or the period of decrease. P2, P4, and P6 each of which is a period during which the relative intensity of illumination light is kept constant is also called a period of no change. To keep the intensity constant during the period of no change, the set value of the intensity needs to be kept constant while some variations caused by errors may be allowed. For example, when the difference between the set value of the light intensity and the average light intensity during a predetermined period is less than 5% of the set value, the light intensity can be considered to remain the same. The set value of the intensity needs to be increased during the period of increase and needs to be decreased during the period of decrease while some variations caused by errors may be allowed. When the pattern of changes in the intensity of illumination light includes the period of no change, the entire period from time T1 to time T4 (the period until the relative intensity of illumination light increases from 0 to 1) can be extended. Therefore, the rate of increase of the intensity of illumination light over the entire period is more moderate than in a case where the period of no change is not provided and the length of P1 and that of P3 remain the same. For example, when the length from time T1 to time T2 is set to about three to ten minutes, the relative intensity of illumination light can be increased to I1 while the intensity of illumination light changes not too sharply but rapidly. When the relative intensity of illumination light is thus increased in stages, the active period, of living things, having a specific length can be maintained while stress experienced by the living things can be reduced. During the period of decrease, similarly, a transition from the active period of the living things to the non-active period thereof occurs in stages, and therefore, the active period of the living things can be maintained while stress experienced by the living things can be reduced. As a result, stress caused by changes in the intensity of illumination light and experienced by the living things can be reduced. Further, when the length of P1 and that of P3 are increased and the period of no change is shortened, a similar effect can be attained.

The control unit 22 can perform control for keeping the intensity of illumination light unchanged more easily than control for changing the intensity of illumination light. When the period of change is made shorter than the period of no change, control of the intensity of illumination light by the control unit 22 can be made easy.

Although the control unit 22 may set I1 to, for example, 0.5, I1 is not limited to this and may be set to another value. Although the control unit 22 may set I2 to, for example, 0.4, I2 is not limited to this and may be set to another value. The control unit 22 may set I1 and I2 such that I1>I2 holds. That is, the intensity that is kept constant during the period of no change provided between the periods of increase may be made higher than the intensity that is kept constant during the period of no change provided between the periods of decrease. Accordingly, there is a possibility that living things can perceive, on the basis of the magnitude of the intensity of illumination light during a period of no change, whether the period of no change is followed by the period of increase or the period of decrease. As a result, stress caused by changes in the intensity of illumination light and experienced by the living things can be reduced. Further, the circadian rhythm of the living things is affected to a small degree. The period of no change provided between two periods of increase is also called a first period of no change. The period of no change provided between two periods of decrease is also called a second period of no change.

The control unit 22 may increase the relative intensity of illumination light at a predetermined rate of increase during the period of increase. The predetermined rate of increase may be kept at a specific predetermined value during the period of increase or may change. The control unit 22 may decrease the relative intensity of illumination light at a predetermined rate of decrease during the period of decrease. The predetermined rate of decrease may be kept at a specific predetermined value during the period of decrease or may change. The control unit 22 may set the period of increase and the period of decrease to a first length of time or more. The first length of time may be set to, for example, three minutes. When the period of increase and the period of decrease are set to the first length of time or more, the rate of change of the intensity of illumination light (which includes the absolute value of the rate of increase and that of the rate of decrease) decreases. When the rate of change of the intensity of illumination light is decreased, stress caused by changes in the intensity of illumination light and experienced by living things can be made lower than in a case where illumination light having a constant intensity is turned on and off. When the rate of change of the intensity of illumination light is decreased, the light emitting unit 10 deteriorates to a small degree. As a result, the life of the light emitting unit 10 can be extended. The control unit 22 may set the period of increase and the period of decrease to a second length of time or less. The second length of time may be set to, for example, ten minutes. When the period of increase and the period of decrease are set to the second length of time or less, the length of time during which the control unit 22 continuously changes the intensity of illumination light is limited. As a result, control of the intensity of illumination light by the control unit 22 can be made easy. Note that the control unit 22 may keep the rate of increase of the intensity of illumination light during the period of increase and the rate of decrease of the intensity of illumination light during the period of decrease such that the rate of increase and the rate of decrease are the same. Here, "the same" means that the set value of the rate of increase and the set value of the rate of decrease are the same while some variations in the intensity of illumination light caused by errors may be allowed. Accordingly, slight errors in the rate of increase and in the rate of decrease may be allowed. For example, when the difference between the average rate of increase including an error and the average rate of decrease including an error is less than 5%, the rate of increase and the rate of decrease may be considered to be the same. Accordingly, the rate of change during the entire period in which illumination light is emitted can be further decreased, and stress caused by changes in the intensity of illumination light and experienced by living things can be reduced.

<<Experiment on Growth of Coral>>

The inside of an aquarium was illuminated with light identified with the emission spectrum SP1 illustrated in FIG. 6, the intensity of the light was changed in accordance with the graph illustrated in FIG. 7, and an experiment on the growth of coral was conducted. As parameters for identifying changes in the intensity of the light, the lengths of periods P1 to P7 were set as follows.

P1, P3, P5, and P7: 3 minutes
P2 and P6: 240 minutes
P4: 120 minutes

Regarding the relative intensity of the light, the relative intensity during period P4 was assumed to be 1, and the relative intensity I1 during period P2 was set to 0.5. The relative intensity I2 during period P6 was set to 0.4. Changes in the intensity of the light according to the graph illustrated in FIG. 7 were repeated on a twenty-four-hour cycle. The illumination conditions thus set correspond to conditions on light with which an original environment in which coral that is a target of the growth experiment grows is illuminated.

The weight of the coral growing under the above-described illumination conditions increased from the weight at the time of start of the experiment by about 9% to 12% as a result of two-month growth and increased from the weight at the time of start of the experiment by about 26% to 37% as a result of four-month growth. Further, the coral experienced stress caused by the growth environment to a small degree. Regarding zooxanthellae living together with the coral, the cell density, the photosynthetic pigment amount, and the photosynthetic quantum yield were maintained. On the basis of these results, the lighting device 20 according to this embodiment can reproduce an environment suitable for the growth of coral by controlling the spectrum and intensity of light.

<Control Method for Lighting Device>

Figure 8:
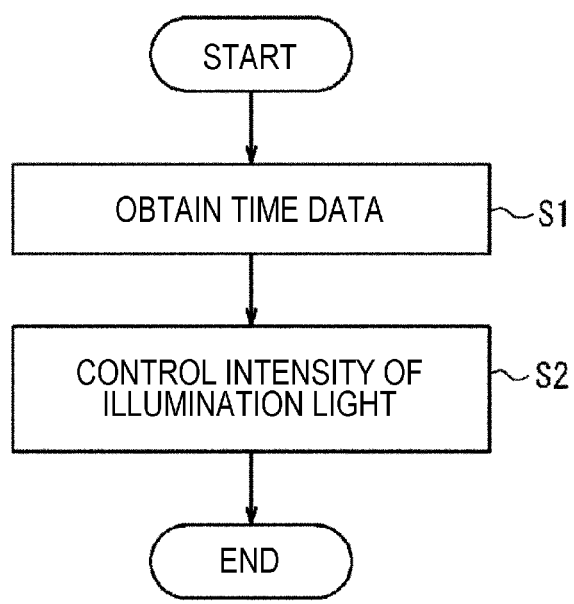
FIG. 8 is a flowchart illustrating an example procedure of a lighting control method.

The control unit 22 of the lighting device 20 may control illumination light by performing a lighting control method that includes the procedure illustrated by the flowchart in FIG. 8. The lighting control method may be implemented as a lighting control program that is executed by the processor that functions as the control unit 22.

The control unit 22 obtains time data (step S1). The control unit 22 may obtain the world standard time or may obtain the standard time set for each region as the time data. The control unit 22 may obtain a time measured by a timer as the time data.

The control unit 22 controls the intensity of illumination light on the basis of the time data (step S2). The control unit 22 may obtain intensity data of the illumination light corresponding to the time data and control the intensity of the illumination light on the basis of the intensity data. The control unit 22 may obtain the intensity data of the illumination light on the basis of a table or a relational expression for identifying a relationship between the time data and the intensity of the illumination light. The table may be stored in the storage unit. The control unit 22 may determine a period, among the period of no change, the period of increase, and the period of decrease, in which the time identified with the time data is included. In a case where the time identified with the time data is included in the period of no change, the control unit 22 keeps the intensity of the illumination light unchanged. In a case where the time identified with the time data is included in the period of increase, the control unit 22 increases the intensity of the illumination light. The control unit 22 may increase the intensity of the illumination light at a predetermined rate of increase. The control unit 22 may increase the intensity of the illumination light at a rate of increase determined on the basis of the time data. In a case where the time identified with the time data is included in the period of decrease, the control unit 22 decreases the intensity of the illumination light. The control unit 22 may decrease the intensity of the illumination light at a predetermined rate of decrease. The control unit 22 may decrease the intensity of the illumination light at a rate of decrease determined on the basis of the time data. The control unit 22 may control the intensity of the illumination light on the basis of a table or a relational expression for identifying a relationship between the time data and the rate of increase or the rate of decrease.

After performing the procedure in step S2, the control unit 22 ends the flowchart illustrated in FIG. 8. The control unit 22 may perform a control method that includes a procedure other than the procedure illustrated in FIG. 8.

The lighting device 20 according to this embodiment may be used to grow aquatic life as described above. The aquatic life is not limited to coral and so on described above and may include fish, such as Japanese rice fish, or may include aquatic plants, such as seaweed and so on. The aquatic life may include living things living in any of seawater, brackish water, or fresh water. The aquatic life is not limited to those described above and may include a variety of living things other than the above. The lighting device 20 may be used to grow not only aquatic life but also land life. The lighting device 20 may be used not only for the purpose of growing living things but also for other various purposes.

The diagrams for describing the embodiment of the present disclosure are schematic diagrams. For example, the dimensions and ratios in the drawings do not necessary correspond to the actual dimensions or ratios.

Although the embodiment of the present disclosure has been described with reference to the drawings and examples, it should be understood that a person skilled in the art can easily make various modifications or corrections on the basis of the present disclosure. Therefore, it should be noted that such modifications or corrections are included in the scope of the present disclosure. For example, functions included in, for example, constituent units can be reconfigured so as not to cause any logical contradiction and, for example, a plurality of constituent units can be combined to form one constituent unit or one constituent unit can be divided.

In the present disclosure, the expressions of, for example "first" and "second" are identifiers for distinguishing the constituent elements from each other. For constituent elements distinguished from each other by the expressions of, for example, "first" and "second" in the present disclosure, the numbers given to the constituent elements can be exchanged. For example, for the first fluorescent substance, its identifier "first" can be exchanged with "second" that is the identifier of the second fluorescent substance. Identifiers are exchanged simultaneously. Even after the exchange of identifiers, the constituent elements are distinguished from each other. An identifier may be removed. A constituent element from which its identifier is removed is distinguished with a reference numeral. The expressions of identifiers, such as "first" and "second", in the present disclosure should not be used to interpret the order of the constituent elements or form a basis that an identifier of a smaller number is present.

REFERENCE SIGNS LIST 10 light emitting unit (2: element substrate, 2A: main surface, 3: light emitting element, 4: frame body, 5: sealing member, 6: wavelength conversion member, 60: translucent member, 61 to 65: first to fifth fluorescent substances)
20 lighting device (25: mounting board, 26: housing, 27: end board, 28: cover)
22 control unit

The invention claimed is:

1. A lighting device comprising:
a light emitting unit that emits illumination light; and
a control unit that controls an intensity of the illumination light, wherein
the control unit controls the intensity of the illumination light in each of a period of no change during which the control unit keeps the intensity of the illumination light constant and a period of change during which the control unit changes the intensity of the illumination light as time passes, and
the period of no change is longer than the period of change wherein
the period of change corresponds to at least one of a period of increase during which the control unit increases the intensity of the illumination light as time passes or a period of decrease during which the control unit decreases the intensity of the illumination light as time passes; and
the period of change includes two periods of increase each of which is the period of increase and two periods of decrease each of which is the period of decrease,
the period of no change includes a first period of no change provided between the two periods of increase and a second period of no change provided between the two periods of decrease, and
the control unit makes the intensity of the illumination light during the second period of no change lower than the intensity of the illumination light during the first period of no change.

2. The lighting device according to claim 1, wherein the control unit keeps a rate of increase of the intensity of the illumination light during the period of increase and a rate of decrease of the intensity of the illumination light during the period of decrease such that the rate of increase and the rate of decrease are the same.

3. The lighting device according to claim 1, wherein the control unit controls the intensity of the illumination light while setting a length of the period of change to three minutes or more.

4. The lighting device according to claim 1, wherein the control unit keeps a rate of change of the intensity of the illumination light during the period of change at a predetermined value.

5. The lighting device according to claim 1, wherein the lighting device is used to grow life.

6. The lighting device according to claim 5, wherein the life includes aquatic life.

7. A lighting control method for the lighting device of claim 1 comprising:
a step, by the control unit that controls the intensity of illumination light emitted by the light emitting unit, of obtaining time data;
a step, by the control unit, of performing control for keeping the intensity of the illumination light constant on the basis of the time data; and
a step, by the control unit, of performing control for changing the intensity of the illumination light as time passes on the basis of the time data, wherein
the period during which the intensity of the illumination light is kept constant is longer than the period during which the intensity of the illumination light is changed.

8. A non-transitory computer readable storage medium to be executed by a processor that functions as the control unit of the lighting device of claim 1 that controls an intensity of illumination light emitted by the light emitting unit comprising:
a step of obtaining time data;
a step of performing control for keeping the intensity of the illumination light constant on the basis of the time data; and
a step, by the control unit, of performing control for changing the intensity of the illumination light as time passes on the basis of the time data, wherein
the period during which the intensity of the illumination light is kept constant is longer than the period during which the intensity of the illumination light is changed.

9. The lighting device according to claim 1, wherein a third period of no change is provided between the periods of increase and the periods of decrease, the third period of no change is shorter than the first period of no change and the second period of no change.

10. The lighting device according to claim 9, wherein the third period of no change is half of the first period of no change and the second period of no change.

11. The lighting device according to claim 1, wherein a third period of no change is provided between the periods of increase and the periods of decrease, a change of the intensity of the light in a period of decrease between the third period of no change and the second period of no change is bigger than a change of the intensity of the light in a period of decrease from the second period of no change to a period of a zero intensity of the light.

12. A lighting device comprising:
a light emitting unit that emits illumination light; and
a control unit that controls an intensity of the illumination light, wherein
the control unit controls the intensity of the illumination light in each of a period of no change during which the control unit keeps the intensity of the illumination light constant and a period of change during which the control unit changes the intensity of the illumination light as time passes, and
the period of no change is longer than the period of change wherein
the illumination light is identified with an emission spectrum that has a first peak wavelength in a range of 360 nm to 430 nm, a second peak wavelength in a range of 430 nm to 475 nm, and a third peak wavelength in a range of 480 nm to 550 nm and in which a relative light intensity decreases as a wavelength increases from the third peak wavelength to a wavelength of 750 nm, and
the relative light intensity at the second peak wavelength is higher than the relative light intensity at the first peak wavelength.

13. A lighting control method for the lighting device of claim 12 comprising:
a step, by the control unit that controls the intensity of illumination light emitted by the light emitting unit, of obtaining time data;

a step, by the control unit, of performing control for keeping the intensity of the illumination light constant on the basis of the time data; and a step, by the control unit, of performing control for changing the intensity of the illumination light as time passes on the basis of the time data, wherein the period during which the intensity of the illumination light is kept constant is longer than the period during which the intensity of the illumination light is changed.

14. A non-transitory computer readable storage medium to be executed by a processor that functions as the control unit of the lighting device of claim 12 that controls an intensity of illumination light emitted by the light emitting unit comprising:

a step of obtaining time data;

a step of performing control for keeping the intensity of the illumination light constant on the basis of the time data; and a step, by the control unit, of performing control for changing the intensity of the illumination light as time passes on the basis of the time data, wherein the period during which the intensity of the illumination light is kept constant is longer than the period during which the intensity of the illumination light is changed.

15. A lighting device comprising:

a light emitting unit that emits illumination light; and a control unit that controls an intensity of the illumination light, wherein the control unit controls the intensity of the illumination light in each of a period of no change during which the control unit keeps the intensity of the illumination light constant and a period of change during which the control unit changes the intensity of the illumination light as time passes, and the period of no change is longer than the period of change wherein the light emitting unit includes a light emitting element and a wavelength conversion member, the wavelength conversion member includes a plurality of fluorescent substances converting light coming from the light emitting element to light having a peak wavelength in a visible light range.

16. The lighting device according to claim 15, wherein the plurality of fluorescent substances convert light coming from the light emitting element to light having different peak wavelengths respectively.

17. A lighting control method for the lighting device of claim 15 comprising:

a step, by the control unit that controls the intensity of illumination light emitted by the light emitting unit, of obtaining time data;

a step, by the control unit, of performing control for keeping the intensity of the illumination light constant on the basis of the time data; and a step, by the control unit, of performing control for changing the intensity of the illumination light as time passes on the basis of the time data, wherein the period during which the intensity of the illumination light is kept constant is longer than the period during which the intensity of the illumination light is changed.

18. A non-transitory computer readable storage medium to be executed by a processor that functions as the control unit of the lighting device of claim 15 that controls an intensity of illumination light emitted by the light emitting unit comprising:

a step of obtaining time data;

a step of performing control for keeping the intensity of the illumination light constant on the basis of the time data; and a step, by the control unit, of performing control for changing the intensity of the illumination light as time passes on the basis of the time data, wherein the period during which the intensity of the illumination light is kept constant is longer than the period during which the intensity of the illumination light is changed.

* * * * *